United States Patent [19]

Mana

[11] Patent Number: 4,875,525
[45] Date of Patent: Oct. 24, 1989

[54] CONSOLIDATED PROPPANT PACK FOR PRODUCING FORMATIONS

[75] Inventor: Michael L. Mana, Dallas, Tex.

[73] Assignee: Atlantic Richfield Company, Los Angeles, Calif.

[21] Appl. No.: 318,867

[22] Filed: Mar. 3, 1989

[51] Int. Cl.$^4$ .................... E21B 43/02; E21B 43/267
[52] U.S. Cl. .................... 166/280; 166/276; 166/281; 166/295
[58] Field of Search ............ 166/276, 280, 281, 295, 166/300, 307, 308

[56] References Cited

U.S. PATENT DOCUMENTS

| | | | |
|---|---|---|---|
| 2,193,808 | 3/1940 | Dieterich | 166/276 |
| 2,881,837 | 4/1959 | Staudt | 166/280 |
| 2,981,334 | 4/1961 | Powell, Jr. | 166/276 |
| 3,217,801 | 11/1965 | Fast et al. | 166/280 |
| 3,235,007 | 2/1966 | Kern et al. | 166/280 |
| 3,364,995 | 1/1968 | Atkins et al. | 166/280 |
| 3,757,862 | 9/1973 | Kern et al. | 166/280 |
| 3,983,941 | 10/1976 | Fitch | 166/276 |
| 4,527,627 | 7/1985 | Graham et al. | 166/280 |

Primary Examiner—George A. Suchfield
Attorney, Agent, or Firm—Drude Faulconer

[57] ABSTRACT

A porous, consolidated proppant pack which can be formed within the fractures of a producing formation and/or within the wellbore of an earthen well adjacent a producing formation wherein both particles of a dissolvable material (e.g., calcium carbonate) and proppants (e.g., sand) that have been coated with an unset consolidating material (e.g., a thermosetting resin) are mixed into a carrier liquid, (e.g., diesel) and then flowed down the well and into or adjacent the producing formation where the consolidating material on the proppants sets and consolidates to form the porous, consolidated proppant pack. The dissolvable material is then dissolved out of the pack (e.g., by an acid overflush) to increase the porosity and hence, the permeability of the pack.

12 Claims, No Drawings

CONSOLIDATED PROPPANT PACK FOR PRODUCING FORMATIONS

DESCRIPTION

1. Technical Field

The present invention relates generally to a porous, consolidated proppant pack for use in producing formations and in one of its preferred aspects, relates to a consolidated proppant pack which contains particles of a material which can be dissolved after the pack has been consolidated in or at a producing formation to provide increased porosity and hence, permeability through the consolidated pack.

2. Background Art

In producing hydrocarbons or the like from a subterranean formation, it is often necessary to treat the formation to increase its permeability in order to establish a satisfactory flow of fluids therefrom. One well known technique for increasing the permeability of subterranean formations is to hydraulically fracture the formation, i.e., a fracturing fluid is pumped down a wellbore and into the formation at a pressure above that at which the bedding planes of the formation separate. When the bedding planes separate, channels are formed in the formation through which fluids can easily flow.

In order to keep the fractures open when the pressure on the fracturing fluid is relaxed, "props", e.g., sand, walnut shells, etc., are routinely mixed into the fracturing fluid and are carried by the fluid into the fractures as they are formed. The "props" remain in the fracture to physically "prop" them open after the fracturing operation has been completed.

To maximize the increase in permeability, the props or proppant particles should have as large of diameter as is practical under the particular circumstances. However, unfortunately, while large-diameter props provide good permeability increase by producing large channels, their use can result in significant drawbacks, especially when they are used to fracture formations which are comprised of fine-grained materials, e.g., sandstones, etc. That is, fractures filled with large props tend to allow the fine-grained material of the formation, e.g., sand, to flow through the fractures along with the formation fluids and (1) be produced therewith to the surface and/or (2) become lodged between the props thereby resulting a partial or total blockage of fluid flow through the fractures. Further, the props if unconsolidated within the fractures sometimes are "backflowed" from the fractures by the produced fluids allowing the fracture channels to close.

To overcome these problems, it is now well known to coat the props, e.g., sand particles, with an unset consolidating material, e.g., a polyurethane resin, which allows the props to be mobile in a carrier liquid, e.g., fracturing fluid, but which will harden and cures under downhole conditions, e.g., temperature. This allows the resin-coated but unset props to be pumped into the fractures and then to adhere and cure to each other when subjected to the formation temperature to form a porous consolidated proppant pack within the fractures and/or in the wellbore adjacent the formation.

While the porous consolidated proppant pack provides a good mechanical barrier to any substantial back flow of props or flow of sand from the formation while allowing good flow of the formation fluids therethrough. However, the matrix of the pack formed by the consolidated resin around the proppants substantially reduces the available void space (i.e., porosity) within the fractures and accordingly reduces the effective permeability originally provided by the fractures. Therefore, a need exists to insure that good porosity and hence, permeability is maintained throughout the proppant pack after it has been placed and consolidated within a formation and/or a wellbore.

DISCLOSURE OF THE INVENTION

The present invention provides a porous, consolidated proppant pack which can be formed within the fractures of a producing formation and/or within the wellbore of an earthen well adjacent a producing formation.

More specifically, the porous, consolidated proppant pack of the present invention is formed by mixing both particles of a dissolvable material and proppants (e.g., sand) that have been coated with an unset consolidating material (e.g., a thermosetting resin) into a carrier liquid (e.g., diesel) and then flowing the carrier liquid down the well into or adjacent the producting formation. Preferably, the carrier liquid is injected ino the well under sufficient pressure to hydraulically fracture the formation whereby the proppants and the dissolvable material are deposited in the fractures so formed.

The carrier liquid and entrained materials are allowed to remain at rest under pressure until the consolidating material on the proppants consolidates to form a solid matrix in which the proppants and dissolvable materials are embedded thereby forming a porous, consolidated proppant pack. Where a thermosetting resin is the consolidating material, the heat from the formation will cure the resin as will be understood in the art.

After the proppant pack has consolidated, the dissolvable material is dissolved out of the pack to increase the porosity and hence, the permeability of the pack. The dissolvable material can be any solid material that can be placed by the carrier liquid and then dissolved without substantially affecting the proppants or the consolidating matrix of the pack. For example, particles of acid-soluble materials (e.g., calcium carbonate) or water-soluble materials, (e.g., sodium chloride) or materials which are dissolved by the formation fluids or heat-soluble materials, (e.g., wax) can be used as the dissolvable material and each is dissolved by an appropriate step once the pack has been consolidated. For example, where the dissolvable material is calcium carbonate, an acid solution (e.g., 3% hydrocarbon acid solution) is flowed down the well and through the pack to dissolve the calcium carbonate particles. If sodium chloride is used, an aqueous solution (e.g., water) is used and if wax is the dissolvable material, the heat of the formation or the formation fluids will dissolve the material and the formation fluid will carry it from the pack.

BEST MODE FOR CARRYING OUT THE INVENTION

In accordance with the present invention, a consolidated, proppant pack is provided which can be placed into fractures within a formation and/or in the wellbore adjacent said formation which provides a good barrier to backflow of props and to flow of solids from the formation but at the same time provides a pack having good porosity and hence, permeability for the flow of fluids from the formation.

As is well known, the ability of a fluid to flow through a particular matrix depends on the permeability (K) of that matrix which is related to porosity (P) of the matrix in the following relationship:

$$K = C$$

where c=constant based on diameter size of proppant.

Further, the conductivity of a fracture ($C_f$) in a matrix is related to permeability of that matrix in following relationships:

$$C_f = K w_f \qquad (2)$$

where: $w_f$=width of the fracture.

From the above, it can be seen that only a small change in porosity P will result in a significant increase of both the permeability and hence, the conductivity of a fracture in a matrix. In the present invention, the porosity and hence, the permeability of a consolidated proppant pack is increased by mixing unset resin-coated props with particles of a solid "dissolvable" material and then dissolving the dissolvable material after the proppant pack has been placed and the resin has set to consolidate the pack within a well.

More specifically, proppant particles, e.g., large-grained sand having 8-60 mesh size (preferably 6-20 mesh), are coated with an unset consolidating material, e.g., thermosetting epoxy, polyurethane, or like resins and a curing agent, if necessary, as is well known in the art. For a further discussion of resin-coated props, see co-pending and commonly assigned U.S. patent application Ser. Nos. 07/304,314 and 07/304,325, both filed Jan. 31, 1989. In the known prior art, the resin-coated props are mixed with a fracturing or carrier liquid, e.g., diesel, and are pumped down a wellbore to be placed in fractures in the formation and/or in the wellbore adjacent the formation. The resin-coated sand then sets and cures e.g., under the influence of the formation temperature) to form a hard, porous consolidated proppant pack having a resin matrix with the proppants dispersed therethrough. The consolidated pack prevents flowback of the proppants and retards the flow of sand or the like from the formation. In addition, the coating protects the proppants from crushing and help resists embodiment of the proppants into soft formations.

In the present invention, particles of a "dissolvable material", preferably having substantially the same mesh size as the resin-coated props are thoroughly mixed with the props wherein the dissolvable material comprises from 5% to 30% of the total combined weight of the dissolvable material and the props. As used herein, "dissolvable material" refers to any material which will remain substantially solid until the proppant pack has been placed and consolidated and which can then be dissolved without dissolving or seriously effecting the proppants or the consolidating matrix material.

One such preferred dissolvable material is an acid-dissolvable material, e.g., calcium carbonate particles, which are mixed with resin-coated sand particles of basically the same mesh size in a 5-30% weight ratio of calcium carbonate to 95-70% sand. The aggregate mixture is then mixed into a fracturing or carrier liquid, e.g., diesel, which is pumped down a wellbore to fracture the formation. The liquid and mixture of props and particles are allowed to rest under pressure until the formation temperature cures the resin thereby forming a consolidated, porous proppant pack. An overflush solution, e.g., acid solution such as a 3% hydrochloric acid solution, is then pumped into the wellbore and through the proppant pack to contact and dissolve the calcium carbonate particles embedded in the consolidate pack thereby increasing the porosity and hence, the permeability of the pack.

Other types of materials can be used as the dissolvable material. For example, water-soluble materials such as water-soluble chlorides, e.g., sodium chloride. When water-soluble materials are used, an aqueous solution, e.g., water, is used to overflush the pack after it is consolidated to dissolve the water soluble particles in the pack. Further, materials that melt at formation temperatures, or which are dissolved by the formation fluids, themselves, e.g., wax, can be used wherein the material will melt after prolonged exposure to those temperatures and/or the flow of formation fluids through the pack and will be carried away by the produced fluids.

It can be seen that by mixing a material that will remain solid until the proppant pack is consolidated and then dissolving the material, the advantages of a consolidated proppant pack are retained while good permeability through the pack is assured.

What is claimed:

1. A method for forming a porous, consolidated proppant pack at or in a producing formation in an earthen well, said method comprising:

mixing both proppants which have been coated with an unset consolidating material and particles of a dissolvable material into a carrier liquid;

flowing said carrier fluid with said proppants and said particles entrained therein down said well to said formation;

allowing said proppants and said particles to remain at rest until said consolidating material on said proppants sets and consolidates to form said porous consolidated proppant pack; and dissolving said particles of said dissolvable material after said proppant pack has been consolidated to thereby increase the porosity and hence, the permeability of said pack.

2. The method of claim 1 wherein said consolidating material comprises:

a thermosetting resin.

3. The method of claim 1 wherein said dissolvable material comprises:

calcium carbonate.

4. The method of claim 3 wherein said step of dissolving said dissolvable material comprises:

flowing an acid solution down said well and through said consolidated pack.

5. The method of claim 4 wherein said acid solution comprises:

a 3% hydrochloric acid solution.

6. A method of claim 2 wherein said dissolvable material comprises:

a water-soluble material.

7. The method of claim 6 wherein said dissolvable material comprises:

sodium chloride.

8. The method of claim 7 where the step of dissolving said dissolvable material comprises:

flowing an aqueous liquid down said well and through said consolidated pack.

9. The method of claim 2 wherein both said proppants and said particles of dissolvable material have a mesh-size range of 8 to 60.

10. The method of claim 9 wherein said particles of dissolvable material constitute from 5% to 30% of the total weight of both the proppants and particles of dissolvable material in said carrier liquid.

11. The method of claim 1 wherein said carrier liquid is used to fracture said formation whereby said consolidted pack is formed within the fractures resulting in said formation.

12. A porous, consolidated proppant pack in an earthen well, said pack being formed by:

mixing both proppants which have been coated with an unset consolidating material and particles of a dissolvable material into a carrier liquid;

flowing said carrier fluid with said proppants and said particles entrained therein down said well;

allowing said proppants and said particles to remain at rest until said consolidating material on said proppants sets and consolidates to form said porous consolidated proppant pack; and dissolving said particles of said dissolvable material after said proppant pack has been consolidated to thereby increase the porosity and hence, the permeability of said pack.

* * * * *